United States Patent
Repko et al.

(10) Patent No.: US 7,315,546 B2
(45) Date of Patent: Jan. 1, 2008

(54) ALIGNMENT OF CLOCK DOMAINS IN PACKET NETWORKS

(75) Inventors: Willem L. Repko, Hilversum (NL); Robertus L. Van Der Valk, Capelle a/d IJssel (NL); Petrus W. Simons, Nieuwerkerk a/d Ijssel (NL); Craig Barrack, Irvine, CA (US)

(73) Assignee: Zarlink Semiconductor Inc., Kanata, Ontario (CA)

( * ) Notice: Subject to any disclaimer, the term of this patent is extended or adjusted under 35 U.S.C. 154(b) by 856 days.

(21) Appl. No.: 10/781,164

(22) Filed: Feb. 18, 2004

(65) Prior Publication Data

US 2004/0264477 A1    Dec. 30, 2004

Related U.S. Application Data

(60) Provisional application No. 60/448,739, filed on Feb. 20, 2003.

(51) Int. Cl.
H04L 12/28    (2006.01)
H04L 7/00    (2006.01)
H04J 3/06    (2006.01)
G06F 1/12    (2006.01)

(52) U.S. Cl. .................. 370/395.62; 370/509; 375/356; 713/375

(58) Field of Classification Search ................ 370/350, 370/395.6, 2, 503–520; 375/354, 356, 371, 375/373, 376; 713/375, 400
See application file for complete search history.

(56) References Cited

U.S. PATENT DOCUMENTS 4,569,042 A    2/1986    Larson (Continued)

FOREIGN PATENT DOCUMENTS

EP    1 146 678 A1    10/2001
WO    0150674 A1    7/2001
WO    WO 01/50674 A1    7/2001

OTHER PUBLICATIONS

Mills, D.L.; "Internet Time Synchronization: the Network Time Protocol"; Network Working Group, Request for Comments: 1129; pp. i-27; University of Delaware; Newark; USA, 1989.

(Continued)

Primary Examiner—Wing Chan
Assistant Examiner—Hong Sol Cho
(74) Attorney, Agent, or Firm—Lawrence E. Laubscher, Jr.

(57) ABSTRACT

Disclosed is a method and apparatus for aligning clock domains over an asynchronous network between a source controlled by a first clock and a destination controlled by a second clock. The predicted delay is estimated for transmitting packets between a source and destination over the network. The time-stamped synchronization packets are sent to the destination, each time-stamped synchronization packet carries timing information based on a master clock at the source. A set of synchronization packets are received at the destination to create a set of data points, and the set of data points is weighted so that synchronization packets exhibiting a delay further from the expected delay are accorded less weight than synchronization packets exhibiting a delay closer to the expected delay. The expected delay is updated to create a current delay estimate based on the set of data points taking into account the different weighting of the data points. These steps are continually repeated on new sets of data points created from newly received synchronization packets using the current delay estimate for the expected delay. And a clock domain at the destination is continually aligned with a clock domain at the source based on the current delay estimate for packets traversing the network between the source and destination.

26 Claims, 3 Drawing Sheets

U.S. PATENT DOCUMENTS

| | | | |
|---|---|---|---|
| 5,260,978 A | 11/1993 | Fleischer et al. | |
| 5,526,362 A | 6/1996 | Thompson et al. | |
| 5,565,923 A * | 10/1996 | Zdepski | 375/240.26 |
| 5,689,689 A * | 11/1997 | Meyers et al. | 713/375 |
| 5,822,383 A | 10/1998 | Muntz et al. | |
| 5,896,427 A | 4/1999 | Muntz et al. | |
| 5,966,387 A * | 10/1999 | Cloutier | 370/516 |
| 5,995,570 A | 11/1999 | Onvural et al. | |
| 6,259,677 B1 | 7/2001 | Jain | |
| 6,363,073 B2 | 3/2002 | Nichols | |
| 6,493,832 B1 | 12/2002 | Itakura et al. | |
| 6,629,249 B2 * | 9/2003 | Gonzalez | 713/400 |
| 6,658,025 B2 | 12/2003 | Mauritz et al. | |
| 7,031,306 B2 * | 4/2006 | Amaral et al. | 370/389 |
| 7,047,435 B2 * | 5/2006 | Liou et al. | 713/500 |
| 2001/0000071 A1 * | 3/2001 | Nichols | 370/395 |
| 2002/0136335 A1 * | 9/2002 | Liou et al. | 375/354 |
| 2006/0153182 A1 * | 7/2006 | Lockridge et al. | 370/389 |

OTHER PUBLICATIONS

Ahmed, Hassan J.; Adaptive Terminal Synchronization in Packet Data Networks; IEEE; 1989; Electrical, Computer and Systems Engineering Department, Boston University; Boston.

* cited by examiner

ALIGNMENT OF CLOCK DOMAINS IN PACKET NETWORKS

CROSS-REFERENCE TO RELATED APPLICATION

This application claims the benefit under 35 USC 119(e) of U.S. Provisional Application No. 60/448,739 filed Feb. 20, 2003, the contents of which are incorporated by reference herein.

FIELD OF THE INVENTION

The present invention relates to the field of digital communications. More specifically, the present invention relates to a method of aligning clock domains in packet networks.

BACKGROUND OF THE INVENTION

When isochronous services, such as voice or video, are transported over a packet network, some means must be provided for carrying timing information over the network. Several well known methods exist for transmitting a clock over a packet network. Methods that currently are in use include Plesiochronous mode, Synchronous Residual Time Stamp (SRTS) described in U.S. Pat. No. 5,260,978, Fleisher et al., or variant RTS method, Adaptive Clock Recovery (ACR), and combinations thereof. These methods rely either on the availability of a shared clock, as is the case for SRTS, an algorithm to transport physical clock information through a packet network, as is the case for ACR, or just accept the clock problem and work around it, as is the case for plesiochronous mode.

The use of a shared clock is not attractive due to the associated costs for a GPS receiver or wiring, including connectors and the like. The current performance of ACR is not sufficient to meet all telecommunication standards, which typically require absolute time stabilities in the order of 50-20 ns.

A clock transport mechanism should ideally meet a number of requirements. It should be suited for telecommunication applications and meet the relevant standards for telecommunications, such as Bellcore 1244, Bellcore 253 etc. It should not require existing hardware to be modified. The solution ideally should be able to handle clock transportation end-to-end without any modification whatsoever for the intervening network. Generally, the second best alternative is that the solution be applied in a moderately well controlled environment, wherein important nodes in the network and the density of the traffic are controlled. The latter is typically necessary for telecommunications applications that require a limited delay through the network. As such, the solution should be in line with existing Service Level Agreements (SLA's). The solution should also be reproducible, adaptive, and operate in various networks. Different network topologies and different uses of a network create different problems. An ideal clock transport mechanism should be robust against that kind of variability.

FIG. 1 illustrates a typical general purpose architecture for a clock transport mechanism. The clock source has a local clock signal, typically generated by a crystal oscillator. The intention is for this clock signal to be copied from the clock source to the clock copy blocks. The copy blocks have their own local oscillators. These blocks determine the difference between their respective local oscillators and the source clock, and at least present this difference as a correction factor, which can be used either for correction of the actual clock, for instance by using frequency synthesis techniques, so as to align it with the source clock or for correction of data that relate to that clock.

Current methods do not meet these requirements for various reasons. For example, in ACR, the variability of the delay of packets is a problem, independent of the method employed. If an algorithm uses the degree of filling of a FIFO for packets, such as timing packets, the arrival times are determined and the algorithm uses direct statistics on the data. The problem with such an approach is that the delays can be modeled essentially as a stochastic process. Averaging of the packet arrival rate as input for some time recovery mechanism, such as a PLL, does work, but is very slow, as is known from standard signal theory. For instance, if the packet arrival delays have a 1 σ value of 2 ms, and the desired 1 σ for averaged time accuracy is 2 µs, the number of packets that is required to arrive at a solution is $1000^2=1,000,000$. If the real packet rate is 100 packets per second, 10,000 seconds are required. A time constant of 10,000 seconds requires very expensive crystal oscillators or even atomic resonators (the cheapest crystal oscillators start to have problems around 1-10 seconds), which is prohibitive for the solution both in required lock time and cost of the solution. Simply increasing the packet transfer rate is not feasible, as the bandwidth overhead for timing purposes only should remain restricted to a few percent. But 100 packets/s of the minimum length packets for Ethernet already yields 100*84*8=67200 bit/s, which is 0.7% of a 100 Mbit/s Ethernet. Increasing this rate by a factor 10 would decrease the effective low pass frequency by a factor 10, which is still far from the range of cheap crystals, but already uses up a lot of network bandwidth.

The plesiochronous solution is not satisfactory. This solution accepts the fact that there will be 'slips', and tries to minimize the frequency of such slips, typically by employing expensive, high accuracy clocks. Accepting slips can be acceptable for voice applications, but for synchronous data applications it can become quite disastrous. If combinations of specific forms of security are associated with the traffic (such as stream ciphering), a slip may result in the loss of a session altogether. This may require the connection to be rebuilt. In modern networks, where many types of service are intermingled, such solutions are not acceptable.

SRTS requires a shared clock to be present. This may be a physical line, but may also be a clock, such as a GPS-based clock. The attraction of this solution is that high qualities for clocking are possible and relatively simple to implement. At the same time, the associated cost for the extra wiring or (backplane) antenna plus receiver (GPS), is quite high. Since cost is one of the main driving factors to get synchronous traffic over packet networks, SRTS-like solutions are not attractive.

Other solutions include NTP (Network Time Protocol), CesiumSpray and the like. Elson, Girod, and Estrin, all from UCLA have recently proposed a relatively high quality solution, under the name Reference Broadcast Synchronization (RBS), as discussed in their article 'Fine-Grained Network Time Synchronization using Reference Broadcasts'. This article was published as 'UCLA Computer Science Technical Report 020008'. Reference-Broadcast Synchronization (the contents of which are herein incorporated by reference). In this proposal, nodes send reference beacons to their neighbors using physical-layer broadcasts.

In RBS all nodes that need synchronization share an event in the form of receiving a Reference Broadcast, and utilize time stamping on arrival of packets. The receiving nodes then exchange information about the time of arrival of the synchronization packets according to their local clocks. This is shown in FIG. 2. The event generator sends event packets to the receiving nodes. This method avoids the delays associated with the Send Time (the time between the instruction to send a reference and the actual sending) and the Access Time (The contention time for access to Ethernet). The delay time that is still incurred is the Propagation Time (which is just the physical time for transfer of the packet across the physical medium, typically something related to the speed of light for electric media, and the Receive Time (which is the time between the actual reception, and the detection of it).

For telecomm systems the RBS method has a few shortcomings. The method necessitates a physical broadcast channel. For many existing and future networks, this is far from reality. The use of the method in the paper noted above, in wireless sensors, is a typical example where a physical broadcast medium does exist. But in wired networks that support wireless networks, a physical broadcast channel does not exist. Instead the network consists of many switches with point-to-point connections, such as in UTP Ethernet networks. In such networks broadcasting is performed by copy actions inside the switching elements. In such switches, generally the use of multicasting techniques is preferred.

RBS can be used in point-to-point networks if the switching elements also support the technique. For some networks this may be feasible, but most network operators require freedom of choice for equipment. Thus RBS would have to be accepted by all manufacturers of switches, routers and transceivers before it could be deployed safely. This is not very likely to happen.

RBS, as it is described in the above paper, does not regenerate a physical clock. In the application envisaged in the above paper that is not necessary since the clock mismatches are used to repair measurement values for sensors. Some aspects of RBS, such as the use of regression instead of filtering, are questionable.

The use of time routing is solved in RBS, i.e. getting timing from one domain to another over a node that is in both domains, only if both domains use physical broadcasts, and only to the extent that the lack of synchronous detection is ignored. The lack of synchronous detection accumulates errors over routing points. But worse, in switched networks without RBS support in the switches, the time routing becomes a huge problem, because each hop introduces Access Time, as discussed in the RBS documentation. Another problem with RBS is that it uses duplex connections; all nodes exchange their information.

U.S. Pat. No. 6,658,025 describes a method for network clock synchronization in a packet network that employs an iterative process. Time stamps, providing timing information, are sent from a transmitting network element to a receiver network element, having an oscillator. Expected times for reception are estimated, deviations from the expected time for the time stamps are calculated, and at least one time stamp deviating the most from the estimated expected time is removed. Again, expected times are estimated, compared to the remaining time stamps and at least one time stamp deviating the most is removed. This cycle is repeated until a pre-determined number of time stamps are removed. Using the remaining time stamps, the frequency of the receiver oscillator estimated and adjusted accordingly.

The described iterative process is generally slow due to the mathematical calculations at each stage of the synchronization requiring the history of the compensation. Also, the described iterative process only solves the frequency synchronization problem, but not the problem of phase synchronization, which is more complex.

SUMMARY OF THE INVENTION

The present invention adopts an adaptive approach while retaining the positive aspects of methods, such as RBS. In one embodiment, use is made of time stamping (using the time of network activities) so that the beginning of a packet can be established with a free running counter. The invention can work over a simplex channel.

The invention depends on the realization that if RBS is applied to a network with switches not designed to support RBS, the delays at the switching nodes cannot be avoided, but instead can be detected, and packets with excessive delays can be discarded with reasonable success. At the same time, it is possible to avoid such delays as much as possible, so as to keep the number of discards to a minimum.

According to one aspect of the present invention there is provided a method of aligning clock domains over an asynchronous network between a source controlled by a first clock and a destination controlled by a second clock. The method comprises a) estimating a predicted delay for transmitting packets between a source and destination over the network, b) sending time-stamped synchronization packets to said destination, each time-stamped synchronization packet carrying timing information based on a master clock at said source, c) receiving a set of synchronization packets at said destination to create a set of data points, d) weighting said set of data points so that synchronization packets exhibiting a delay further from said predicted delay are accorded less weight than synchronization packets exhibiting a delay closer to said expected delay, e) updating said predicted delay to create a current delay estimate based on said set of data points taking into account the different weighting of said data points, f) continually repeating steps d and e on new sets of data points created from newly received synchronization packets using the current delay estimate for said expected delay, and g) continually aligning a clock domain at said destination with a clock domain at said source based on the current delay estimate for packets traversing the network between the source and destination.

In another aspect the invention provides an apparatus for aligning clock domains over an asynchronous network between a source controlled by a first clock and a destination controlled by a second clock. The apparatus comprises a) a predictor for predicting the delay expected for packets traversing the network between a source and destination, b) a sender for sending time-stamped synchronization packets to said destination, each time-stamped synchronization packet carrying timing information based on a master clock at said source, c) a receiver for receiving a set of synchronization packets at said destination to create a set of data points, and d) a non-linear filter for weighting said set of data points so that synchronization packets exhibiting a delay further from said predicted delay are accorded less weight than synchronization packets exhibiting a delay closer to said expected delay. The predictor updates said predicted delay to create a current delay estimate based on said set of data points taking into account the different weighting of said data points. The clock domain at said destination is continually aligned with a clock domain at said source based on the current delay estimate for packets traversing the network between the source and destination.

The invention relates the various clocks to shared events on the network with proper processing to avoid misinterpretation of the observed behaviors and take into account possible network delays. The resulting performance can be shown to be superior due to elimination of a few error effects. Thus the invention can serve as an improvement over ACR, which in turn makes methods, such as RTS, with its associated extra cost, unnecessary.

The invention permits a lock to be achieved much more rapidly than the prior art. For example, full lock can be achieved within as little as 15 seconds as compared to 45 minutes or more in the prior art. The invention also permits precise frequency alignment and phase alignment as good as 300 ns. Prior art methods do not permit precise phase alignment.

In this specification the terms switches, routers and transceivers will be used loosely. A transceiver normally does not exhibit much delay, whereas switches and routers do. The invention is applicable to all such devices.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

Figure 1:
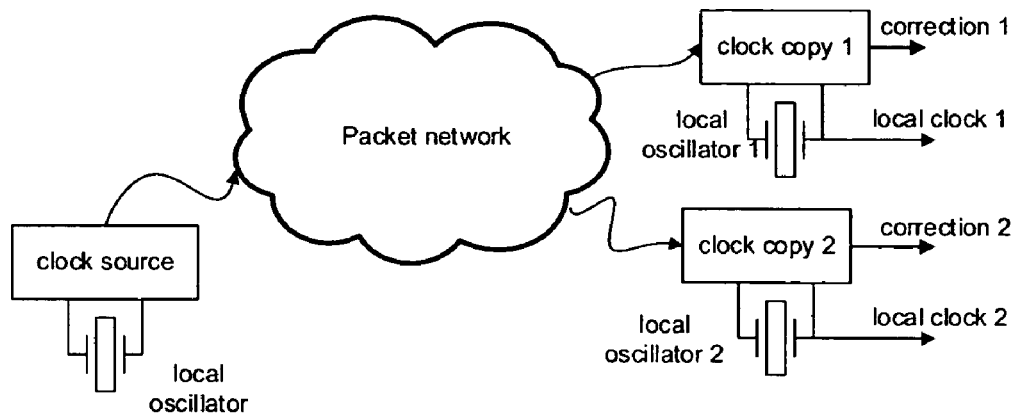
FIG. 1 is a schematic diagram of a network with a clock transport mechanism.
Figure 2:
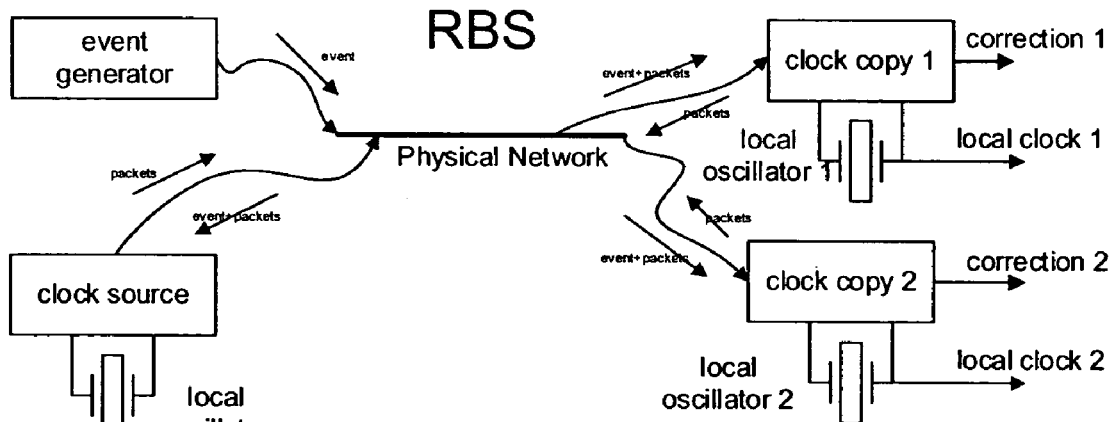
FIG. 2 is a schematic diagram of a network implementing RBS.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE PREFERRED EMBODIMENTS

As discussed above, RBS normally requires a physical medium to be present directly between the nodes. It does not work well when switches and routers that do not support RBS are present since they introduce a large delay that RBS cannot handle.

In the discussion of RBS, the set of delay components falls into four parts:

Send Time. This is the time necessary construct a message. In a hardware environment, it can be made very small fairly easily; in a computer environment higher priority interrupts will interfere.

Access Time. This is the time required gain access to the physical medium. I can be quite large as a result of contention control, for example, in Ethernet.

Propagation Time. This is typically very small, although in telecommunications the variation of propagation delay is a factor of importance (also due to the long lines).

Receive Time. This is the time necessary on the receive side to properly detect the message. Like the Send Time, it is dependent on the implementation.

The RBS method avoids the first two factors by relying on physical broadcasts. A suitable design can make the Receive Time small and constant (interrupts), and the Propagation Time is small. Thus RBS yields a good performance in an environment where physical broadcasts are allowed.

RBS as described in the prior art cannot be implemented in a switched network without a router or switch supporting RBS due to the total set of delays, which is more or less two subsequent sets of delays as defined in RBS. In accordance with the principles of the invention, RBS is modified so that it can be used with routers and switches not designed specifically to support RBS.

The Send Time at the sending nodes is made negligibly small using standard hardware and software design practices.

The Access Time at the sending node is still significant, but time stamping on the sending node is employed so that the actual time that a packet leaves the sending node after the delay incurred at Access Time Sending Node is known.

The Propagation Time to the Switch/router is generally small number with a small variability, and is not a significant factor.

If an intermediate switch supports RBS, it can timestamp the Receive/send Time as accurately as possible with its local clock, and forward the timing information. However, if the switch does not support RBS, as is assumed to be the case, the delay time incurred in reception is not guaranteed to be 0 or even necessarily very small. Reception and preparation for sending it out again may be interfered by numerous other processes. For instance, a backbone bus carrying maintenance traffic could take precedence. Or the processor may be busy with its timer tick etc.

Just like at the sending node, it may take some time at the switch to actually access the physical medium. In practice, this delay is not due to contention, but queuing, especially since the networks of interest have point-to-point connections only. The queuing arises because several streams in the switch compete for the same output stream. This is the most severe cause of delay.

The Propagation Time to the receiver is quite small and of little significance.

The Receive time at the receiver can be made small by suitable design considerations.

The main cause of the delay is the time involved in the queuing in the switch. This delay cannot be avoided and is unknown if the node is not designed to support RBS as in practice the case.

The delay through a switch or router is normally modeled as a pseudo random process. The delay depends on traffic density through the switch. If a switch is heavily loaded, the chance that traffic is subjected to delays is quite large. If the density is low, the chance that the traffic passes unhampered is much greater. If the other traffic is zero, there is still a chance of some hindrance. This is caused by, for instance, maintenance traffic inside the switch, such as is associated with dynamic memories, management functions and so on.

The invention can be best understood by considering that if timing traffic enters a switch, the traffic is either delayed or not. Even if the density of traffic is quite high, the chance is that there will be a significant amount of traffic that passes through the switch unimpeded with a minimal delay dependent only on the characteristics of the switch. The difference in delay between delayed and non-delayed traffic will mostly be large, and depends on the size of the queue that is handling other traffic. The delay will have a typical distribution, for instance, associated with the typically dominating traffic of 64 or 1518 bytes data packet length. It is thus possible detect the delay and discard the packets that have been significantly delayed.

Discarding packets does not present a problem as more than enough data points will be left. Even with 90% of the traffic discarded, the remaining points will still carry enough information. For example: Suppose 100 packets per second are used for sending out timing information in the form of a multicast. If 90% of packets are discarded, only 10 packets per second are left. But if these packets arrive within a time range of 1 μs (the rest being discarded), the starting point for a clock recovery filter will be 10 samples per second, each being within the 1 μs range. If an effective low pass frequency of 0.1 Hz is possible, the attenuation of a factor 10 (square root 100) is quite trivial, leading to an end accuracy of about 100 ns. The accuracies that can be achieved with this kind of approach are well within the normal order of magnitude for telecomm clock alignment.

While the packets showing a large delay will be discarded, there will be some packets exhibiting a small delay. This delay will be caused by other traffic, which has the following statistical behavior: suppose the network uses 100 Mbit/s Ethernet, 46 bytes payload (minimum) packets only. Such a packet actually is 84 bytes long including the header and interframe gap must be added, and would thus have an effective length of 84*8*10 ns=6720 ns. Suppose that the traffic density is about 20% and consists of only these short packets. Finally suppose that discarding is done with a simple comparison relative to the actual desired clock, and discard happens when the difference is more than 200 ns. In that case, the percentage of time delayed packets that arrive after going through the discard process will be 0.2*200/6720=0.6%. Thus 79.4% will arrive undelayed after discarding. The 0.6% will have an average delay of 100 ns (half of 200 ns), which makes the total average delay equal to (0.794*0+0.006*100 ns)*100/80=750 ps. Such numbers indicate that the achievable performance is quite good.

The limit of the performance of the novel method can be chosen close to zero if the conditions allow. In the example of a physical broadcast channel such as used in RBS, this implies that the maximum performance will not be limited to something like a single bit time, or a fraction thereof, but something much closer to zero. Thus the novel method supplies the best performance that conditions allow.

The effect of discarding synchronization packets is not serious. Moreover, it should be noted that networks that require clocks to be transported typically have minimum requirements on delays in the first place. In such networks, the maximum density has to be kept quite low; otherwise it becomes next to impossible to guarantee any level of service. Furthermore, in networks where contention may occur, the maximum bandwidth is quite limited. It is known that above some threshold such networks lock up, i.e. that effectively no traffic will be transported. The effective threshold value is quite low, for contention Ethernet, typically around 20-30%.

At the same time, the presence of discarding is a reason to minimize delays in the traffic as much as possible. The mechanism is best served with a sending node that timestamps its output by observing the signals on the receiver of that node (which is always possible in contention networks) so that the Access Time at the Sending Node is avoided. If this is not done, an extra delay factor may occur. If several delays appear in series, the likelihood of traffic being delayed rises fast, with an exponential curve as a function of the number of delays. The number of delays should desirably be kept to a minimum, although at the same time it is not highly critical to do so at all cost. Well designed networks will always have some undelayed packets.

It might be thought that the distinction between discarded and undiscarded packets becomes difficult if only 10% survive. This is not so. The arrival of packets should be quite accurate. Discarded packets will not only have a large deviation, but also within that deviation a large variation. Thus the 90% discarded packets will not show a lot of coherence. This property is very important, and can be verified with simple mathematical tools.

The discarding can be chosen to result in one of two forms of degradation or a combination of the two: a lower pass characteristic (so wait till the number of points gathered is large enough) or accept degraded performance. If the degradation reaches unacceptable proportions, such as too low pass frequencies, the possibility is always there to override the clock recovery process and put the recovered clock into holdover mode. This is helpful for short periods in which bursty traffic temporarily blocks the clock transport mechanism.

The actual accuracies that can be managed using the principles of the invention without specific measures are easily in the order of 100 ns. This is identical to sampling with a 10 MHz clock, which is technically not difficult. For modern networks the typical clock rate will in fact easily run up to 100 MHz for 100 Mbit/s Ethernet.

Thus in accordance with one embodiment of the invention, an event is sent/multicast by the sending side over the network and time stamped on all receiving nodes, and the sending node itself. Time stamping stores the local time, which can be provided by a counter. The sending side the sends its timestamps over the network to the receiving nodes. This timestamp may be just the current time, so that every delay in the processing gets attached to the packet, or be determined while sending the previous packet. In this case, the actual timestamp is determined by receivers on the receiving side and the sending side.

The use of local time, that is not making use of the local receiver on the sending side, gives extra performance problems, but they can be covered by the same algorithm as the delays in switches and routers.

The timestamps are received by the receivers on the side that want to recover the local clock on the sending side.

The large deviations from the expected time values are discarded. The remaining values are used to determine the difference between the local clock on the sending side and the local clock on the receiving side.

The mathematical operation to establish the true clock ratio can be any tracking mechanism. Suitable examples are fitting, filtering and the like.

The way that the time stamping is carried out will limit the accuracy of the transport mechanism. On the sending side there is no problem. Even if the time stamp is derived from the time the multicast was received back, the clocks are still the same, and time stamping is perfect or near perfect. This makes the clock rate on the sending side relatively unimportant; even with very low clock rates the accuracy remains high, i.e. if the jitter on the clock remains small.

Figure 3:
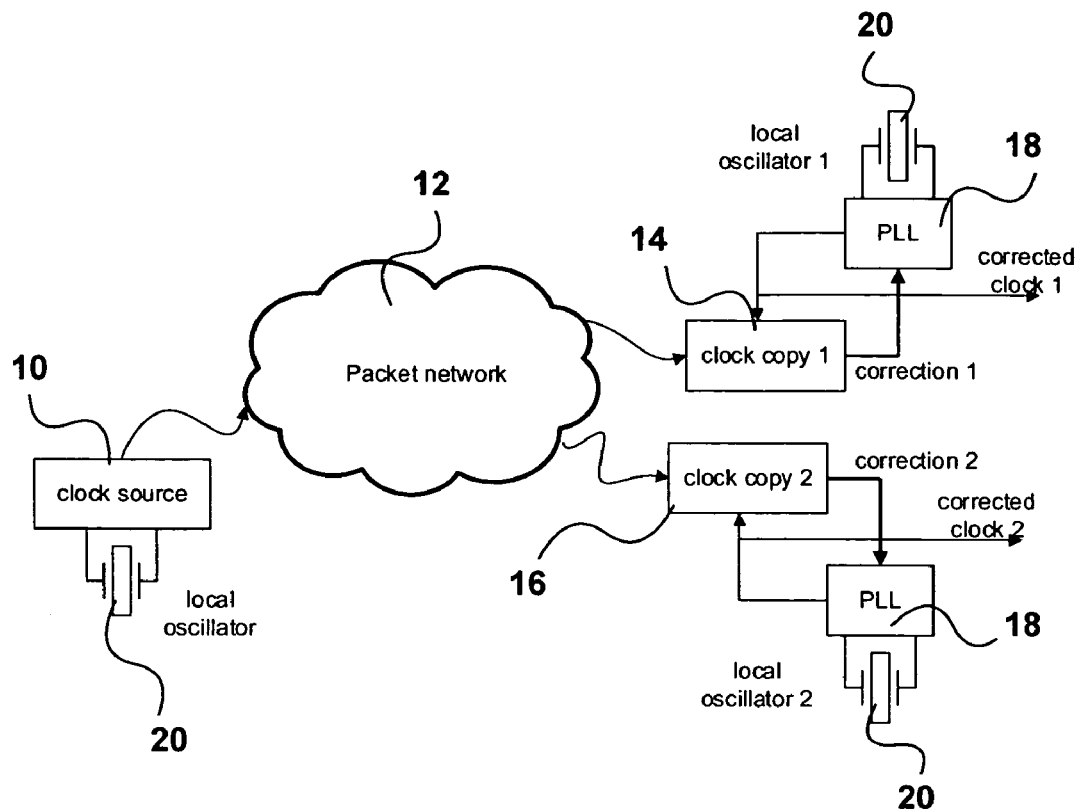
FIG. 3 is a schematic diagram of one embodiment of a clock transport mechanism in accordance with principles of the invention employing synchronous detection.

However, the receiver side is more problematical since it uses another clock. In order to avoid unnecessary inaccuracies due to timing differences, the receiver timing should also become more or less equal to the sending side. This can be achieved in two ways: either by the use a very high frequency for time stamping, and thus increase accuracy, or the use of the reconstructed clock of the receiver to do the sampling on the input of the receivers. This approach is known per se under the name synchronous detection. This typically requires PLL-like functionality that is controlled by the clock's phase difference, as determined from the time stamping. Such an arrangement is shown in FIG. 3, where source clock 10 is connected through network 12 to clock recovery blocks 14 and 16, each of which is associated with a phase locked loop (PLL) 18 with crystal oscillator 20.

The effect of synchronous detection is that the quantization error in the time stamping caused by the different clocks is forced to zero. In fact, this is a noise shaping method, with the PLL's Controlled Oscillator as integration element and a phase comparator as modulo element. This shows that well known techniques can be used to make the effective error very small in a very short period of time.

A very convenient implementation of the synchronous detection is to use a frequency synthesizer that runs on a fixed crystal oscillator. The crystal oscillator will have accuracy and stability limitations compared to the sending side, but not so much as other low cost oscillators. The synthesizer will have a digital input that can easily be read out. This reading can be used to accurately express the ratio between sender clock and receiver clock.

Figure 4:
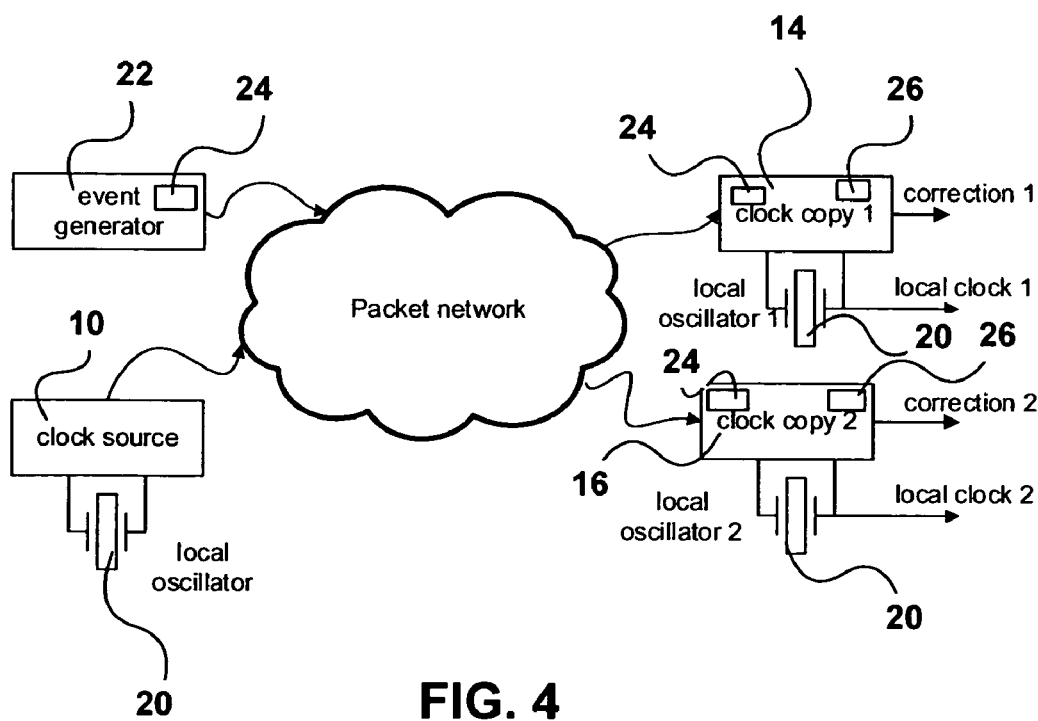
FIG. 4 is a schematic diagram of an embodiment of a clock transport mechanism in accordance with principles of the invention.

The technique described so far uses two different things: a multicast or broadcast, and the sending of a timestamp. In the description so far the two have been joined in a single node. This is preferred in the sense that the Sending Node Access Time can be avoided by measuring in the sender the moment that the message leaves. There is an alternative solution that has slightly different properties, as was already proposed in RBS, and that is to use a multicast or broadcast, from any place, and determine timestamps on the place that was designated as sender, and on the places designated as receivers. The advantage of this arrangement is that the delays from broadcaster to time stampers may be expected to be more symmetrical. In itself that may not be expected to be good, for the delays from one node to several other nodes through the switch are normally highly independent, which just effectively increases the total delay that needs to be suppressed. However, the switch may also introduce delays that are symmetrical, and could be seen as input queuing on the switch. Such delays will be in 'common mode' for all receivers. For instance, there will be switches that have a relatively large input queue. This can be due to internal housekeeping that occupies an internal bus/backbone so that input traffic cannot be switched to the correct output. In such cases, the symmetrical approach, but with a different broadcaster, may perform better. FIG. 4 shows such an arrangement.

In FIG. 4, the event generator 22 acts as multicast source from another location than either master or slave nodes. Event generator 22 includes time stamper 24. A special case of the broadcast arises when the sender side originates the broadcast or multicast, but does not so much measure the time that the message leaves, but that it returns from the switch or router. This implies that the node should also multicast to itself. Many switches do not support such 'auto-copying', so that this method is somewhat dubious. The clock units 14 include discard units 26, which discard the excessively delayed packets.

An extra disadvantage of a separate broadcaster is that the traffic increases: there is a broadcast message, and messages from the sender (source) node to the receiver (copy) nodes. Thus the timing traffic more or less doubles.

Another arrangement is possible, with the broadcaster on the slave side, and the master on the other side. As this implementation requires the extra traffic (broadcasting from slave to master, and sending clock data from master to slave) but does not yield better performance (the multicast path is not symmetric) this solution is not preferred.

Due to the nature of the discarding process, it is allowable to use an event multicaster separate from master and slave nodes, or let them coincide. The latter is simpler in configuration and occupies less bandwidth, but has an extra delay factor, which will have some impact (but small) on performance.

It has been noted that time stampers can be simple counters. It is very useful to have a fixed representation of local time, even if the crystal is changed. For the exchange of data, the use of normalized notation is important. This can be achieved by using an accumulator that is programmed to add slices of time. For instance a DCO (which is an accumulator) can add slices of 50 ns when running at 20 MHz, and 100 ns when running at 10 MHz. In fact a DCO can be seen as a counter that counts fractions instead of 1 only.

With a sufficiently large DCO the least significant bit can be chosen to represent arbitrarily small numbers of time. It is expected that something in the order of 1 ps will always be so accurate that that accuracy is not going to be matched by the other computational elements, so that this number will never become a limiting factor.

The DCO can be extended upward, up to a maximum level of at least several seconds. If the DCO can handle seconds, the maximum delay variation that the solution can handle is the same. If the variation could be larger, the chance exists that the counter simply wraps, and thus loses a piece of information. It may even be prudent to make sure that the maximum time capacity of the DCO is larger than the largest inter-packet time. It is not unlikely that packet rates of 1 packet/s or even less are required, so that it may be desirable to make the DCO quite large.

The data needs filtering before being used, as expressed for instance in earlier usage of the word 'discard'. Filtering can take on many forms, but in general the following can always be stated linear filtering methods are not sufficient. They are hampered by the limited bearing they have. This is caused by the delays being pseudorandom and large. Effective filtering requires therefore long time periods, which is contradicting performance aspects as required locking time. Instead linear filtering would effectively mean large locking times, and therefore expensive frequency references such as oversized crystals. Thus the use of non-linear methods is desirable, both from cost price point of view as performance.

Figure 5:
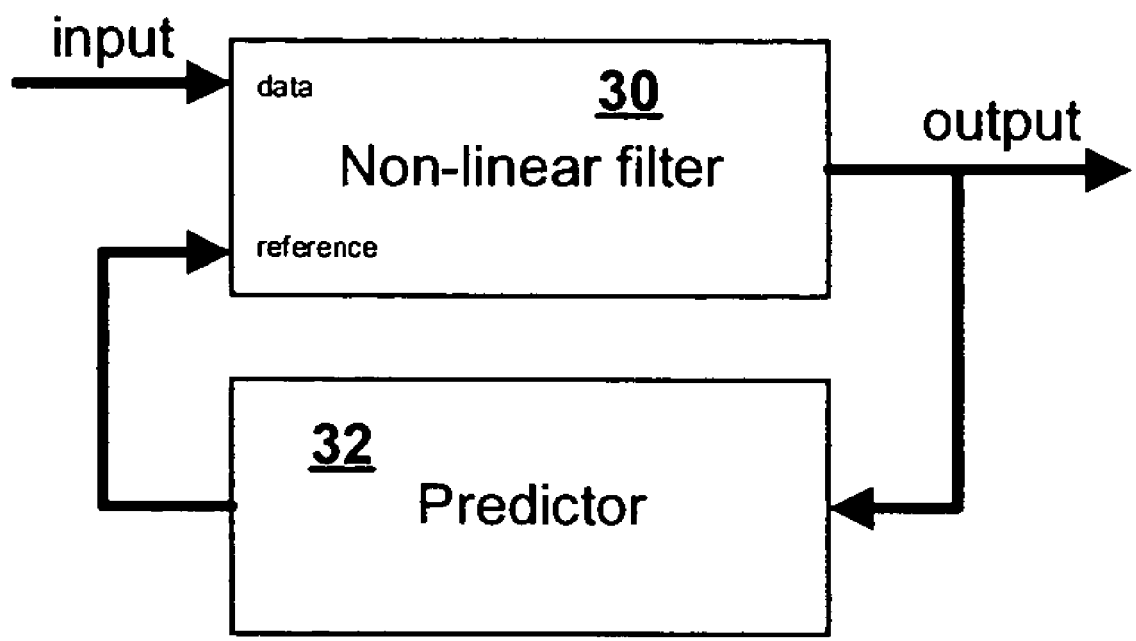
FIG. 5 is a block diagram of a device for discarding samples.

An important step is the discarding of information. In systems with relatively low noise and high signal levels, it is never attractive to reduce the information rate by eliminating samples. Every sample for which the noise is smaller than the actual signal will be able to contribute to the final result. However, as there is a small signal and a lot of noise, it pays to throw out the inaccurate samples, for that adds to the accuracy. To do this it becomes necessary to have some reference to compare samples against. The reference is by and large dependent on the same sample sequence (the delay times vary over time in such a way that this is critical), so that that reference becomes a product of the same algorithm, as shown in FIG. 5. In this Figure, the input signal is fed into a non-linear filter 30 whose output is fed back to the input through a predictor 32.

The non-linear filter 30 skips all data that are too far off the current reference, and the predictor establishes what the current reference is towards which the measurement of too far off applies. This method works well once the solution is found, for then the predictor has a good value to start off from. As long as the prediction algorithm, frequency bandwidths and band of allowable data are relevant compared to the expected clock drifts (not to the delays from the network), the method will stay on track. If the filter starts up in a non-locked mode (or falls into non-locked mode), the predictor will drift around until it happens to be in the right place, in which case the method will lock after all. The pseudo-randomness of the data plays an important role in this latter movement. The greatest problem with this approach is that it is difficult to predict the locking time other than expressing it as a probability.

Several possibilities arise for the filters. For example, they can discard all data further than some amount away from the predictor value. The amount can be made semi-dynamic to account for variable conditions in which the algorithm works. Then again, this value may not vary too often, as then the basic filter will have three input variables. In such a case the lock behavior is not simple to guarantee any more.

Another possibility is to discard all data leaving only a few data points closest to the predictor to survive. The number of points can be as low as one, depending a bit on how the predictor works.

A third possibility is similar to the first, but with some extra requirement on the time-distance between the surviving points. When surviving points are relatively close to each other, the sensitivity of the tangent for small variations in the points is much larger than for points that are further away.

For a predictor, it is possible to use the frequency estimation of the last measurement as predictor of the current data. This can be seen as a first order predictor. The predicted value is continually updated based on the delay determined from the previous set of data.

A higher order predictor (so second or more) can be attractive, but does take more memory to calculate the values from. In fact, any degree of Taylor series can be used, although it may be more convenient to use other functions than the normal power series of x, $x^2$, $x^3$ etc. Alternative series might be exponential series, but that would typically only be interesting for known behaviors, for instance as with oversized crystals with a known temperature time constant.

The discarding of samples is a specific form of the general class of weighting solutions. By using weights on every sample, it becomes possible to be very sensitive to signals close to where you expect them, and much less sensitive to others, but not completely insensitive. Of course, if use is made of weights 0 and 1 only, the effect becomes the same as that of throwing away samples. The block diagram for weighted algorithms is not different from the previous figure. Weighting can be convenient to remain sensitive to discardable data, for instance when the delays are not pseudorandom. This can be helpful to capture and track behavior of the solution. Weighting can be implemented with a few fixed values, or as some formula, such as $x/(1+x^2)$, with x being the difference between predictor and measurement. Small differences have the same large weighing factors (then the formula works out as $x/(1+0)=x$), large differences become less important (then the formula works out as $x/(x^2)=1/x$).

The described forward predicting process for estimating expected time stamp values is less mathematically complex, and requires less time to compute than the iterative process described in U.S. Pat. No. 6,658,025.

The described method thus permits the reliable transport of timing information over networks that are not designed specifically for RBS. No physical broadcast is required, but instead a logical broadcast is used. Accurate time stamping is employed.

The invention permits a lock to be achieved much more rapidly than the prior art. For example, full lock can be achieved within as little as 15 seconds as compared to 45 minutes or more in the prior art. The invention also permits precise frequency alignment and phase alignment as good as 300 ns in the case of five switches and an 8-bit processor. Prior art methods do not permit precise phase alignment.

Numerous modifications may be made without departing from the spirit and scope of the invention as defined in the appended claims.

What is claimed is:

1. A method of aligning clock domains over an asynchronous network between a source controlled by a first clock and a destination controlled by a second clock, comprising:
   a) estimating a predicted delay for transmitting packets between a source and destination over the network;
   b) sending time-stamped synchronization packets to said destination, each time-stamped synchronization packet carrying timing information based on a master clock at said source;
   c) receiving a set of synchronization packets at said destination to create a set of data points;
   d) weighting said set of data points so that synchronization packets exhibiting a delay further from said predicted delay are accorded less weight than synchronization packets exhibiting a delay closer to said predicted delay;
   e) updating said predicted delay to create a current delay estimate based on said set of data points taking into account the different weighting of said data points;
   f) continually repeating steps d and e on new sets of data points created from newly received synchronization packets using the current delay estimate for said predicted delay; and
   g) continually aligning a clock domain at said destination with a clock domain at said source based on the current delay estimate for packets traversing the network between the source and destination.

2. A method as claimed in claim 1, wherein packets having a delay more than a predefined value are accorded a weight of zero and thereby discarded for the purposes of estimating said predicted delay.

3. A method as claimed in claim 2, wherein said predefined values are expected values of the delay.

4. A method as claimed in claim 1, wherein said synchronization packets are multicast from the sending node.

5. A method as claimed in claim 1, wherein said synchronization packets are broadcast from the sending node.

6. A method as claimed in claim 1, wherein said synchronization packets are time stamped at the sending node.

7. A method as claimed in claim 6, wherein said packets are time stamped at the sending node with the time of actually leaving the sending node.

8. A method of aligning clocks as claimed in claim 6, wherein said synchronization packets are also time stamped on arrival at receiving nodes.

9. A method as claimed in claim 8, wherein a recovered clock at the receiver is used to time stamp the arriving packets.

10. A method as claimed in claim 9, wherein said recovered clock is obtained from the incoming synchronization packets with the aid of a phase-locked loop.

11. A method as claimed in claim 1, wherein said delayed packets are weighted with the aid of a non-linear filter having feedback through a predictor for predicting said predicted delay.

12. A method as claimed in claim 11, wherein said predictor uses a frequency estimate of the last measurement as an expected value of current data.

13. A method as claimed in claim 12, wherein said predictor has an order of two or more.

14. An apparatus for aligning clock domains over an asynchronous network between a source controlled by a first clock and a destination controlled by a second clock, comprising:
   a) a predictor for predicting the delay expected for packets traversing the network between a source and destination;
   b) a sender for sending time-stamped synchronization packets to said destination, each time-stamped synchronization packet carrying timing information based on a master clock at said source;
   c) a receiver for receiving a set of synchronization packets at said destination to create a set of data points;
   d) a non-linear filter for weighting said set of data points so that synchronization packets exhibiting a delay further from said predicted delay are accorded less weight than synchronization packets exhibiting a delay closer to said predicted delay;
   e) said predictor updating said predicted delay to create a current delay estimate based on said set of data points taking into account the different weighting of said data points;
   whereby said clock domain at said destination can be continually aligned with a clock domain at said source based on the current delay estimate for packets traversing the network between the source and destination.

15. An apparatus as claimed in claim 14, wherein packets having a delay more than a predefined value are accorded a weight of zero and thereby discarded for the purposes of estimating said predicted delay.

16. An apparatus as claimed in claim 15, wherein said predefined values are expected values of the delay.

17. An apparatus as claimed in claim 14, wherein said synchronization packets are multicast from the sending node.

18. An apparatus as claimed in claim 14, wherein said synchronization packets are broadcast from the sending node.

19. An apparatus as claimed in claim 14, wherein said synchronization packets are time stamped at the sending node.

20. An apparatus as claimed in claim 19, wherein said packets are time stamped at the sending node with the time of actually leaving the sending node.

21. An apparatus for aligning clocks as claimed in claim 19, wherein said synchronization packets are also time stamped on arrival at receiving nodes.

22. An apparatus as claimed in claim 21, wherein a recovered clock at the receiver is used to time stamp the arriving packets.

23. An apparatus as claimed in claim 22, wherein said recovered clock is obtained from the incoming synchronization packets with the aid of a phase-locked loop.

24. An apparatus as claimed in claim 14, wherein said delayed packets are weighted with the aid of a non-linear filter having feedback through a predictor for predicting said predefined value.

25. An apparatus as claimed in claim 24, wherein said predictor uses a frequency estimate of the last measurement as an expected value of current data.

26. An apparatus as claimed in claim 25, wherein said predictor has an order of two or more.

* * * * *